Nov. 30, 1965 D. C. LIVINGSTON 3,221,273

SINGLE SIDEBAND HALL MODULATOR

Filed Oct. 1, 1962 2 Sheets-Sheet 1

INVENTOR
DONALD C. LIVINGSTON
BY
R. J. Frank
ATTORNEY

Nov. 30, 1965 D. C. LIVINGSTON 3,221,273

SINGLE SIDEBAND HALL MODULATOR

Filed Oct. 1, 1962 2 Sheets-Sheet 2

INVENTOR
DONALD C. LIVINGSTON
BY R. J. Frank
ATTORNEY 3,221,273

SINGLE SIDEBAND HALL MODULATOR

Donald C. Livingston, Bayside, N.Y., assignor to General Telephone and Electronics Laboratories, Inc., a corporation of Delaware Filed Oct. 1, 1962, Ser. No. 227,435
5 Claims. (Cl. 332—51)

This invention relates to devices utilizing the Hall effect and in particular to apparatus for producing single sideband modulation of a carrier signal.

In a Hall-effect device, current flowing through a semiconductor is deflected by a magnetic field applied at right angles to the direction of current flow. The direction of current deflection is perpendicular to both the direction of current flow in the absence of the magnetic field and the direction of the magnetic field. This deflection causes an accumulation of carriers at one side of the semiconductor and a corresponding deficiency of carriers on the other side. As a result, a potential difference is produced across the semiconductor which is a function of the current. This potential difference is called the Hall voltage and the phenomenon which produces it is known as the Hall effect.

Typically, the semiconductor consists of a rectangular element known as a Hall plate having a pair of input electrodes at opposite ends thereof and a pair of output electrodes located on opposite edges of the plate. Thus, a first axis passing through the input electrodes is perpendicular to a second axis passing through the output electrodes, the first and second axes defining a plane parallel to the surface of the plate. The voltage produced across the output electrodes is proportional to the product of the magnetic flux density and the magnitude of the current in the plate.

I have devised a new type of device which utilizes the Hall effect to produce single-sideband suppressed-carrier modulation of a carrier signal.

As is well known, a carrier amplitude-modulated by a single-frequency modulating signal may be thought of as consisting of a first signal component varying sinusoidally at the carrier frequency, a second signal component varying sinusoidally at the sum of the carrier and modulating frequencies and a third signal component varying sinusoidally at the difference between the carrier and modulating frequencies. Expressed mathematically, the instantaneous voltage is $$e=E_0 \cos \omega_c t+\frac{mE_0}{2} \cos (\omega_c-\omega_n)t+\frac{mE_0}{2} \cos (\omega_c+\omega_n)t \quad (1)$$

where $E_0$ is the amplitude of the unmodulated wave, $m$ is the degree of modulation, $\omega_c$ is the carrier frequency in radians per second, $\omega_n$ is the modulating frequency in radians per second, and $t$ is time in seconds. In a single-sideband suppressed-carrier modulation system the carrier component $\cos \omega_c t$ and one of the two sideband components are suppressed. That is, all of the information is conveyed by either the sideband component varying at the frequency $\omega_c-\omega_n$ or by the component varying at the frequency $\omega_c+\omega_n$.

In the present invention, first and second Hall plates are so oriented with respect to first and second magnetic fields that their surfaces are normal to the directions of the magnetic fields. The strengths of these first and second fields vary at the modulating frequency and are displaced 90° in time phase. Signals varying at the carrier frequency and displaced 90° in time phase with respect to each other are applied to the input electrodes of the Hall plates. As will be shown hereinafter, the voltages appearing across the output electrodes of the Hall plates each have a first component with a frequency $\omega_c-\omega_n$ and a second component with a frequency $\omega_c+\omega_n$ corresponding to the lower and upper sidebands, respectively. These output voltages are added algebraically to produce an output proportional to a selected one of the two sidebands.

The above objects of and the brief instruction to the present invention will be more fully understood and further objects and advantages will become apparent from a study of the following description in connection with the drawings, wherein.

Figure 1:
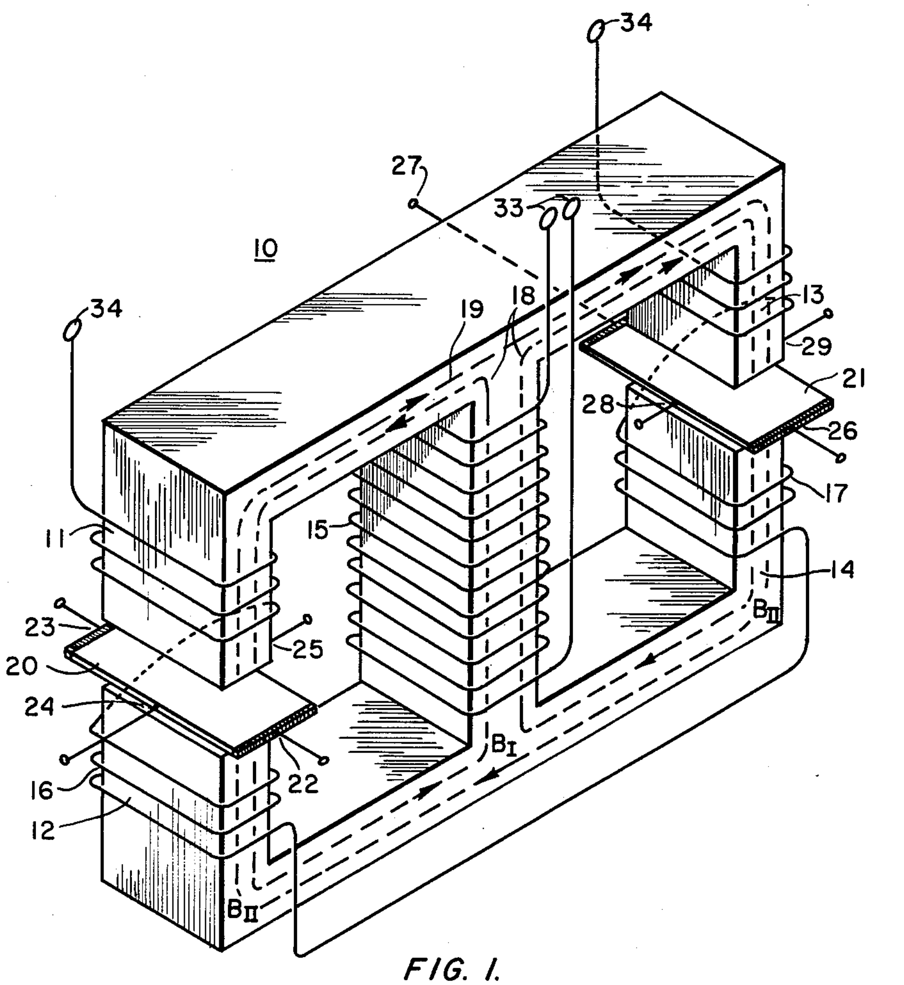
FIG. 1 is a schematic drawing of my Hall device.

Referring to FIG. 1, there is shown a laminated magnetic core 10 composed of a high permeability material having a first gap between pole pieces 11 and 12 and a second gap between pole pieces 13 and 14. These gaps are actually made much narrower than shown, the spacing between the pole pieces being exaggerated for clarity. A winding 15 is placed on the inner leg of the core and two series-connected windings 16 and 17 are wound on each of the outer legs. The number of turns on each of the outer windings 16 and 17 is equal to one-half the number of turns on the inner winding 15. Windings 15 and 17 are wound so that the magnetic flux produced by the inner winding 15 adds to that produced by the outer winding 17 in pole pieces 13 and 14 and subtracts from that produced by outer winding 16 in pole pieces 11 and 12 as shown by the sample flux lines 18 and 19.

A Hall plate 20 is placed between pole pieces 11 and 12 and is so oriented that the magnetic field produced by windings 15 and 16 is normal to the surface of the plate. Similarly, a Hall plate 21 is oriented between pole pieces 13 and 14 so that the magnetic field produced by windings 15 and 17 is normal to its surface. Hall plates 20 and 21 are each composed of an indium arsenide crystal having a carrier mobility of about 15,000 cm.$^2$/volt-sec. Input electrodes 22 and 23 are affixed to opposite ends of plate 20 and output electrodes 24 and 25 are secured to opposite edges of plate 20. The Hall plates are rectangular so that a line between input electrodes 22 and 23 and a line between output electrodes 24 and 25 intersect at right angles, thereby defining a plane parallel to the surface of plate 20. Similarly, plate 21 is provided with input electrodes 26 and 27 and output electrodes 28 and 29.

Figure 2:
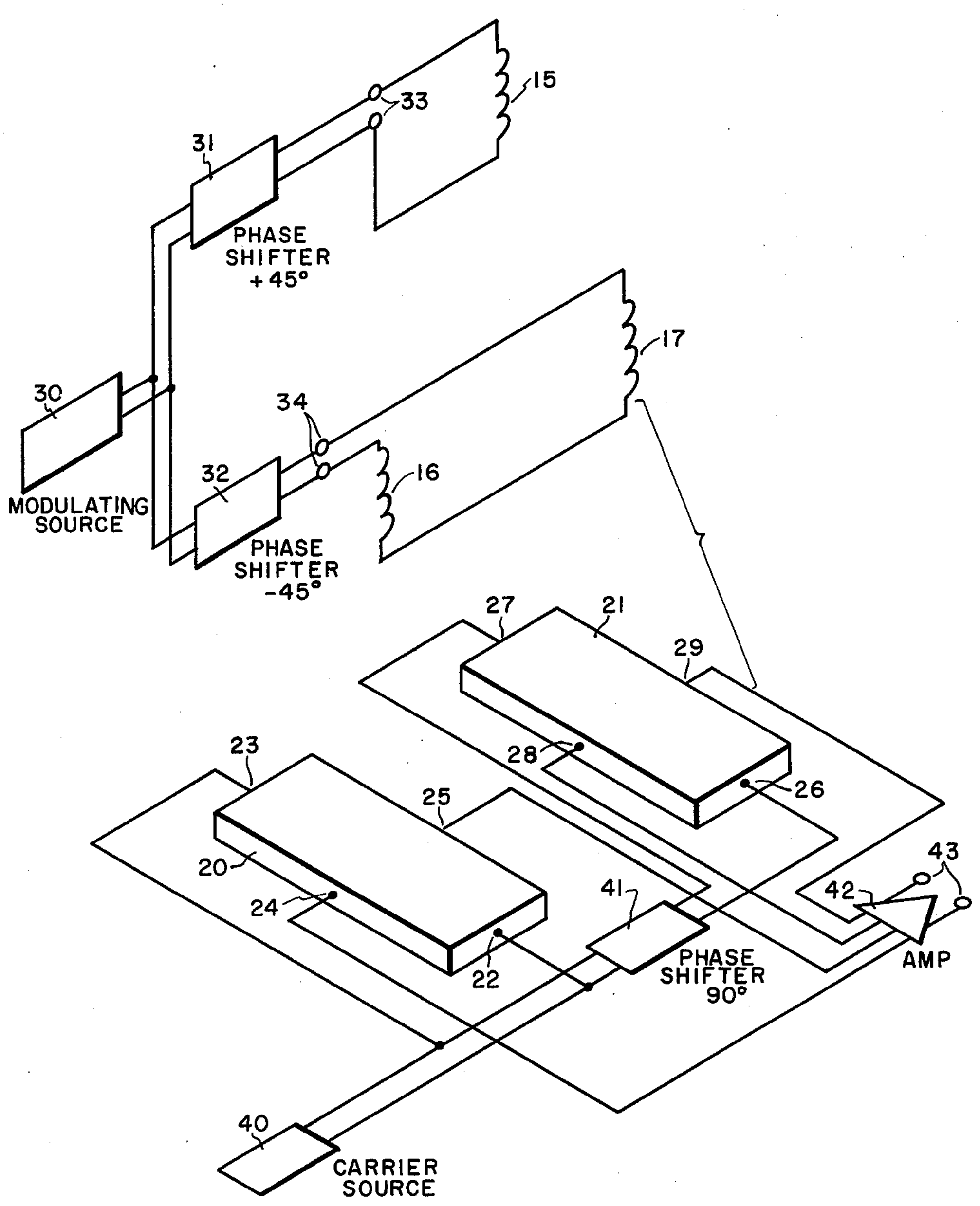
FIG. 2 is a system for producing single-sideband suppressed-carrier modulation utilizing the device of FIG. 1.

FIG. 2 depicts a system in which the Hall device of FIG. 1 is used to produce a single-sideband suppressed-carrier output. The magnetic core 10 has been omitted from FIG. 2 for clarity, windings 15–17 and plates 20 and 21 being shown schematically. The flux density in the magnetic field generated by inner winding 15 is designated $B_I$ and the flux density in the magnetic field generated by outer windings 16 and 17 has been designated $B_{II}$. The total flux density produced in Hall plate 20 is equal to $B_I-B_{II}$, and the total flux density produced in plate 21 is $B_I+B_{II}$, where $B_I=B_{II}$.

The modulating signal, which is generated by modulating source 30, ordinarily contains a number of frequencies. Assuming the distribution of frequencies to be discrete, the modulating signal can be expressed in the form $$\sum_n a_n \cos (\omega_n t-\varphi_n) \quad (2)$$

where $a_n$ is the amplitude of the component with modulating frequency $\omega_n$ and phase $\varphi_n$. If the frequency spectrum is continuous rather than discrete, the summation may be replaced by an integral without affecting the final result.

The output of modulating source 30 is coupled to a first all-pass network 31 which shifts the phase of each frequency component in the modulating signal +45° without introducing appreciable attenuation in the signal and to a second all-pass network 32 which shifts the phase of each frequency component in the modulating signal −45°. Thus, the output of network 31 may be expressed as $$\sum_n a_n \cos(\omega_n t - \varphi_n + \pi/4) \qquad (3)$$

and the output of network 32 as $$\sum_n a_n \cos(\omega_n t - \varphi_n - \pi/4) \qquad (4)$$

The output of network 31 is coupled to terminals 33 of winding 15 and the output of network 32 to terminals 34 of series-connected windings 16 and 17. The resultant magnetic flux density in plate 20 where the fields $B_I$ and $B_{II}$ subtract is the difference between Equations (3) and (4), or $$\sqrt{2}\sum_n a_n \sin(\omega_n t - \varphi_n) \qquad (5)$$

and the flux density in plate 21 where the fields $B_I$ and $B_{II}$ add is the sum of equations (3) and (4), or $$\sqrt{2}\sum_n a_n \cos(\omega_n t - \varphi_n) \qquad (6)$$

A carrier signal having the form $$b \cos \omega_0 t \qquad (7)$$

where $b$ is the amplitude of the carrier signal and $\omega_c$ the carrier frequency, is produced by carrier source 40. This signal is applied directly to input electrodes 22 and 23 of Hall plate 20 and through a 90° phase shifter 41 to input electrodes 26 and 27 of Hall plate 21. The voltage produced across output electrodes 24 and 25 of Hall plate 20 is proportional to the product of the magnetic flux density $B_I - B_{II}$ (Equation 5) and the magnitude of the carrier signal (Equation 7) and has the form $$\sum_n a_n b\sqrt{2} \sin(\omega_n t - \varphi_n) \cos \omega_0 t \qquad (8)$$

This may be expanded to $$\sum_n \frac{a_n b}{\sqrt{2}} \{\sin[(\omega_0 + \omega_n)t - \varphi_n] - \sin[(\omega_0 - \omega_n)t + \varphi_n]\} \qquad (9)$$

Similarly, the voltage across electrodes 28 and 29 of Hall plate 21 is proportional to the product of the magnetic flux density $B_I + B_{II}$ (Equation 6) and the magnitude of the quadrature output signal $$b \sin \omega_0 t \qquad (10)$$

from phase shifter 41. The voltage across electrodes 28 and 29 may be expressed as $$\sum_n \frac{a_n b}{\sqrt{2}} \{\sin[(\omega_0 + \omega_n)t - \varphi_n] + \sin[(\omega_0 - \omega_n)t + \varphi_n]\} \qquad (11)$$

The output voltages from Hall plates 20 and 21 are coupled to an amplifier 42, which may be arranged to either add or subtract the voltages expressed by Equations (9) and (11). If these signals are added in amplifier 42, the voltage appearing across output terminals 43 is $$\sum_n a_n b\sqrt{2} \sin[(\omega_0 + \omega_n)t - \varphi_n] \qquad (12)$$

and consists entirely of upper-sideband frequencies. Conversely, amplifier 42 may be arranged to subtract the Hall-plate output voltages, and the output voltage across terminals 43 will be $$\sum_n a_n b\sqrt{2} \sin[(\omega_0 - \omega_n)t + \varphi_n] \qquad (13)$$

consisting of only lower-sideband frequencies, the carrier $\omega_c$ being suppressed.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A Hall modulator comprising
(a) a magnetic core having first and second legs, said first and second legs having first and second gaps therein, respectively,
(b) a plurality of windings wound on said magnetic core,
(c) means for applying modulating signals to said windings to produce a first magnetic field across said first gap and a second magnetic field across said second gap, said magnetic fields having components produced by said modulating signals of the same frequency and displaced in time phase by 90°,
(d) first and second Hall plates positioned in said first and second gaps, respectively, each of said Hall plates having a pair of input electrodes and a pair of output electrodes, and
(e) means for applying first and second carrier signals to the input electrodes of said first and second Hall plates, respectively, said first and second carrier signals having the same frequency and being displaced in time phase by 90°, the voltage produced across the output electrodes of said first and second Hall plates having frequency components differing from the carrier frequency by the modulating frequency.

2. A modulator comprising
(a) a magnetic core having first and second legs, said first and second legs having first and second gaps therein, respectively,
(b) a plurality of windings wound on said magnetic core,
(c) means for applying modulating signals ot said windings to produce a first magnetic field across said first gap and a second magnetic field across said second gap, said magnetic fields having components produced by said modulating signals of the same frequency and displaced in time phase by 90°,
(d) first and second Hall plates positioned in said first and second gaps, respectively, each of said Hall plates having a pair of input electrodes at opposite ends thereof and a pair of output electrodes located on opposite edges of said plate,
(e) means for applying first and second carrier signals to the input electrodes of said first and second Hall plates, respectively, said first and second carrier signals having the same frequency and being displaced in time phase by 90°, and
(f) means coupled to the output electrodes of said first and second Hall plates for algebraically adding the voltages produced at said electrodes, the output voltage of said means having a frequency displaced from the carrier frequency by the modulating frequency.

3. A modulator comprising
(a) a magnetic core having an inner leg and first and second outer legs, said first and second outer legs having first and second gaps therein, respectively,
(b) first, second, and third windings wound on the inner, first outer and second outer legs, respectively,
(c) means for applying a first modulating signal to said first winding,
(d) means for applying a second modulating signal to said second and third windings, said first and second modulating signals having components of the same frequency displaced in time phase by 90°,
(e) first and second Hall plates positioned in said first and second gaps, respectively, each of said Hall plates having a pair of input electrodes and a pair of output electrodes, (f) means for applying first and second carrier signals to the input electrodes of said first and second Hall plates, respectively, said first and second carrier signals being displaced in time phase by 90° and having the same frequency, and (g) means coupled to the output electrodes of said first and second Hall plates for algebraically adding the voltages produced at said electrodes, the output voltage of said means having a frequency displaced from the carrier frequency by the modulating frequency.

4. A modulator comprising (a) a magnetic core having an inner leg and first and second outer legs, said first and second outer legs having first and second gaps therein, respectively, (b) a first winding wound on said inner leg and second and third electrically-connected windings wound on said first and second outer legs, respectively, (c) first and second phase shifters, the output of said first phase shifter being coupled to said first winding and the output of said second phase shifter being coupled to said second and third windings, (d) a modulating source coupled to the input of said first and second phase shifters, (e) first and second Hall plates positioned in said first and second gaps respectively, each of said Hall plates having a pair of input electrodes and a pair of output electrodes, (f) a carrier source coupled to the input electrodes of said first Hall plate, (g) a third phase shifter coupled between said carrier source and the input electrodes of said second Hall plate, and (h) amplifier means coupled to the output electrodes of said first and second Hall plates, the output of said amplifier means having a frequency differing from the frequency of said carrier source by the frequency of said modulating source.

5. The modulator as defined by claim 4 wherein said first phase shifter shifts the phase of the applied signal +45°, said second phase shifter shifts the phase of the applied signal −45°, and said third phase shifter shifts the phase of the applied signal by 90°.

References Cited by the Examiner

UNITED STATES PATENTS

| | | | |
|---|---|---|---|
| 2,937,329 | 5/1960 | Esche | 331—107 X |
| 2,988,707 | 6/1961 | Kuhrt et al. | 331—107 |
| 3,066,259 | 11/1962 | Lennon | 332—51 X |

OTHER REFERENCES

German aplication, S34,828 VIII a/21a$^4$, September 15, 1955.

ROY LAKE, *Primary Examiner.*

ALFRED L. BRODY, *Examiner.*